US008572264B2

(12) United States Patent
Dutta (10) Patent No.: US 8,572,264 B2
(45) Date of Patent: Oct. 29, 2013

(54) SYSTEMS AND METHODS FOR STATE AWARENESS ACROSS COMMUNICATION CHANNELS AND STATEFULLY TRANSITIONING BETWEEN COMMUNICATION CHANNELS

(75) Inventor: Siddhartha Dutta, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 131 days.

(21) Appl. No.: 13/184,330

(22) Filed: Jul. 15, 2011

(65) Prior Publication Data

US 2013/0019026 A1 Jan. 17, 2013

(51) Int. Cl.
*G06F 13/00* (2006.01)

(52) U.S. Cl.
USPC .............................. 709/228; 709/219; 709/229

(58) Field of Classification Search
USPC ................. 709/217, 219, 227, 228, 229, 238; 379/88.13
See application file for complete search history.

(56) References Cited

U.S. PATENT DOCUMENTS

| 7,321,767 | B2 | 1/2008 | Mizutani et al. |
| 7,353,016 | B2 | 4/2008 | Roundtree et al. |
| 7,418,086 | B2 * | 8/2008 | Sravanapudi et al. ..... 379/88.13 |
| 7,756,264 | B2 | 7/2010 | Reding et al. |
| 2005/0002351 | A1 * | 1/2005 | Kong et al. ................... 370/328 |
| 2011/0071950 | A1 | 3/2011 | Ivanovic |

OTHER PUBLICATIONS

International Search Report and Written Opinion dated Oct. 1, 2012 in Application No. PCT/US2012/046031.

* cited by examiner

*Primary Examiner* — Viet Vu
(74) *Attorney, Agent, or Firm* — Snell & Wilmer L.L.P.

(57) ABSTRACT

A system for providing state awareness across communication channels and statefully transitioning a user between a source channel and a destination channel is disclosed. The method may comprise storing a unique identifier associated with the user and data associated with the user, retrieving the data associated with the user based upon the user identifier and in response to the user entering the destination channel that is different from the source channel, and populating the data associated with the user in the destination channel. The destination channel may comprise a display of a customer service representative, and the populating may occur automatically. Furthermore, the method may comprise placing a call to a telephone number associated with the user in response to at least one of: the user answering a requisite number of questions in the source channel and the user requesting a transition to a voice destination channel.

14 Claims, 8 Drawing Sheets

SYSTEMS AND METHODS FOR STATE AWARENESS ACROSS COMMUNICATION CHANNELS AND STATEFULLY TRANSITIONING BETWEEN COMMUNICATION CHANNELS

BACKGROUND

1. Field

The present disclosure generally relates to communications systems, and more particularly, to communication systems for state awareness across communication channels and statefully transitioning users between communication channels.

2. Related Art

Businesses have long relied upon Computer Telephone Integration ("CTI") systems to facilitate interactions between user service agents and the users that they serve. Commonly, CTI systems are configured to receive and process a variety of basic user data (e.g., social security number, phone number, account number, type or category of problem experienced, etc.) For example, CTI systems may locate a user account based upon information provided by the user in response to one or more automated questions (e.g., where such an account exists), identify a user service agent suited to assist with the problem experienced by the user, connect the user to the selected agent, and populate the computer display ("screen pop") of the agent with the user's information.

Currently, businesses may interact with users across a variety of communication channels. For example, businesses regularly receive inquiries over the telephone and internet. More recently, businesses may be contacted via smart phone apps and social networking websites. Thus, businesses may receive user inquiries across a wide variety of communication channels.

However, each of these communication channels typically operates independently of the other channels, and although there are integrated CTI systems (e.g., Cisco ICM) that enable communication across several channels (i.e., an agent may communicate with a user in a voice/chat/email channel), the data collected in one channel is typically unavailable in other channels. In other words, existing CTI systems do not permit a user to maintain an inquiry across a plurality of independent channels. Rather, a user who enters data in a voice channel, for example, must reenter this data in a mobile, email, chat, social, etc networking channel to continue his inquiry.

Accordingly, a system capable of maintaining user information across a variety of communication channels is needed. Such a system will be of assistance to user service agents, in that users will not be required to repeat certain information, wherein such an advantage may itself result in a more rapid overall resolution of user inquiries. Moreover, users may enjoy, through such a system, the freedom to resolve inquiries across a spectrum of destination communication channels.

SUMMARY

The present disclosure includes a system, method, and article of manufacture for state awareness across communication channels and statefully transitioning a user between a source channel and a destination channel. The method may comprise storing a unique identifier associated with the user and data associated with the user, retrieving the data associated with the user based upon the user identifier and in response to the user entering the destination channel that is different from the source channel, and populating the data associated with the user in the destination channel. The destination channel may comprise a display of a customer service representative, and the populating may occur automatically. Furthermore, the method may comprise placing a call to a telephone number associated with the user in response to at least one of: the user answering a requisite number of questions in the source channel and the user requesting a transition to a voice destination channel. Further still, the method may comprise transmitting a telephone number associated with a customer service representative to a device associated with the user. The method may, in addition, comprise transitioning the user to a destination channel in response to the user selecting an option on a social networking website. Moreover, the method may comprise statefully transitioning the user to a destination channel that is at least one of a web channel, a mobile channel, and a voice channel. The method may further comprise statefully transitioning the user to a destination channel from a voice source channel. The system may further maintain a state awareness between communication channels and display, based upon the state awareness, an estimated wait time.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

A web client includes any device (e.g., personal computer) which communicates via any network, for example such as those discussed herein. A web client may include a web browser comprising Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, smart phones, cell phones, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, a user may the "enter", "occupy" or communicate in a communication channel, and these terms are, for the purposes of this disclosure, may have similar meanings and the different terms are included merely to simplify and clarify this disclosure. A user who enters or occupies a communication channel is a user who communicates in or by way of the communication channel.

A system for state awareness across communication channels and/or statefully transitioning between communication channels is disclosed. For example, a system for transitioning a user from one communication channel to another communication channel is disclosed in which the data entered by the user in the first communication channel is maintained such that it is available, and need not be reentered, in the second communication channel.

Figure 1:
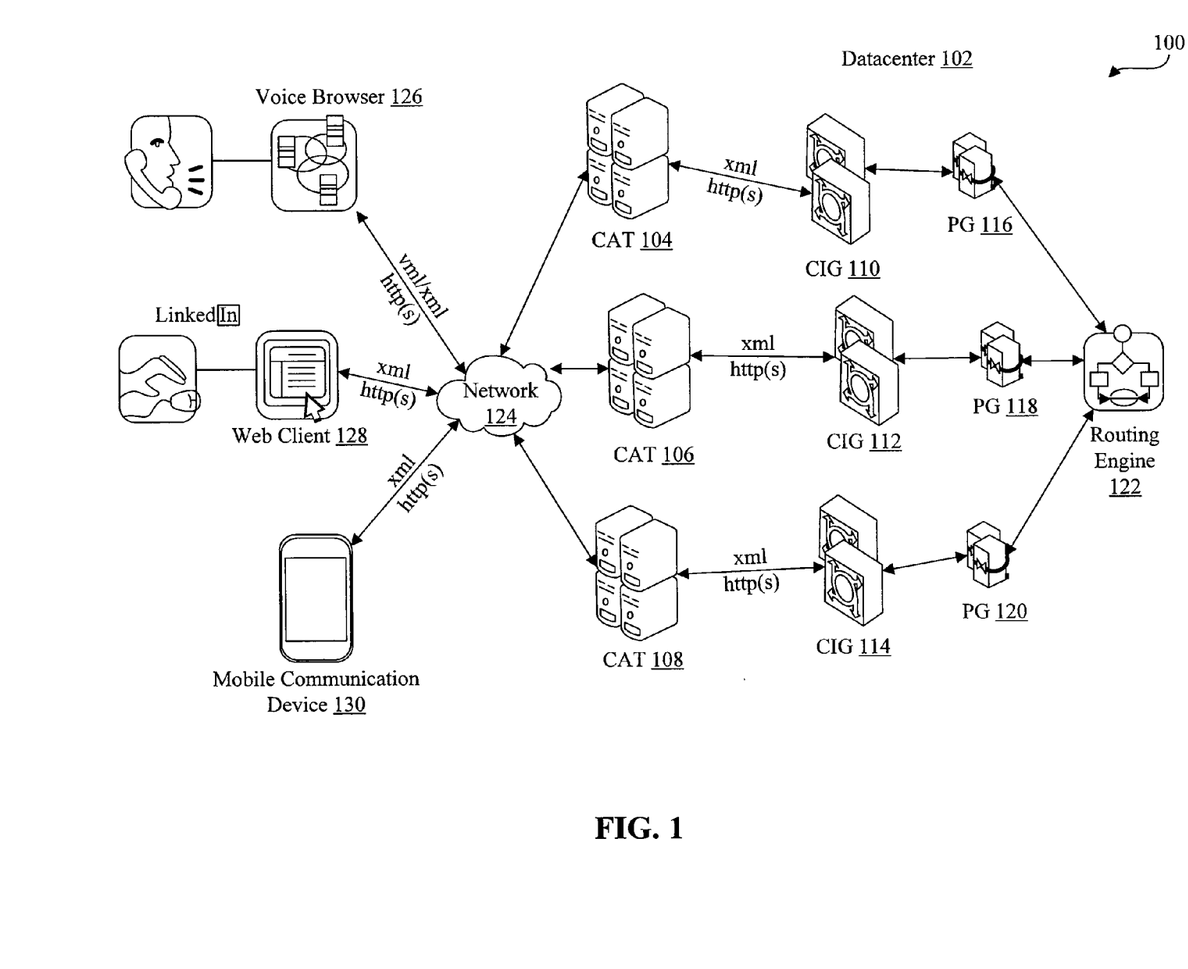
FIG. 1 shows an exemplary application tier based system diagram in accordance with an embodiment.

Referring to FIG. 1, an exemplary application tier based system 100 for state awareness between communication channels and/or transitioning a user between communication channels is disclosed. In various embodiments, a user is statefully transitioned between communication channels. System 100 may comprise a datacenter 102, which may comprise one or more Channel Application Tiers ("CATs") 104, 106 and/or 108, one or more Channel Integration Gateways ("CIGs") 110, 112, and/or 114, one or more Peripheral Gateways ("PGs") 116, 118, and/or 120, and/or one or more routing engines 122. Each CAT, CIG, and/or PG may process data for a particular communication channel or type of communication channel. For example, CAT 104, CIG 110, and/or PG 116 may process data for a voice and/or voice response (e.g., telephone) ("VR") channel, while CAT 106, CIG 112, and/or PG 118 may process data for a web or internet channel (e.g., email, chat, etc.), and CAT 108, CIG 114, and/or PG 120 may process data for a mobile channel (e.g., text messaging).

Each of CATs 104, 106, and/or 108 may comprise one or more application servers and may coordinate a variety of processes and/or applications to control an application's functionality. For example, CAT 104 may serve one or more voice browser and/or voice response applications to a user's telephone, such that the user is able to interact with CAT 104. Likewise, CAT 106 may serve a variety of web-based software applications to a user's web client and/or web browser, such that the user is able to interact with CAT 106 to request. Similarly, CAT 108 may serve one or more mobile applications to a user's mobile communication device, such that the user is able to request and receive a variety of information. CATs 104, 106, and/or 108 may also move and process data between network 124 and CIGs 110, 112, and/or 114, respectively.

Each of CIGs 110, 112, and/or 114 may comprise one or more servers and may operate to communicate with (and/or control, in some cases) the CAT 104, 106, and/or 108 with which it is associated. For example, CIG 110 may include logic and/or software that enables it to communicate with (and/or control) CAT 104. CIGs 110, 112, and 114 may, in addition, communicate with PGs 116, 118, and/or 120, respectively, as described below.

PGs 116, 118, and/or 120 may comprise one or more servers and may operate to communicate with (and/or control, in some cases), the CIG 110, 112, and/or 114 with which it is associated. PGs 116, 118, and/or 120 may further communicate with and request and/or receive routing information from routing engine 122.

Routing engine 122 may comprise one or more computer servers configured to integrate a variety of communication channels. For example, routing engine may route communications through a plurality of communications channels between a user service agent and a user, such that the user may, for example, communicate with the agent via several channels. Thus, for example, routing engine may permit an agent to communicate with a user via voice, chat, and email during a single session. In an embodiment, routing engine may comprise a server or group of servers running Cisco Intelligent Contact Management ("ICM") software.

Each of the CATs, CIGs, PGs, and/or routing engine 122 may communicate, via network 124, with one or more user devices 126, 128, and/or 130. User devices 126, 128, and/or 130 may comprise web clients. For example, device 126 may comprise a web client such as a smart phone or standard telephone running a voice browser, while device 128 may comprise a web client such as a personal computer running a web browser. Similarly, device 130 may comprise a mobile communication device, such as a cell phone or smart phone, running a micro app, web browser, etc.

Devices 126, 128, and/or 130 may communicate with datacenter 102 by way of any suitable programming language and/or communication protocol. For example, device 126 may communicate with datacenter 102 via vxml, xml, and/or http(s), while device 128 may communicate with datacenter 102 via xml and/or http(s), and device 130 may communicate with datacenter 102 via xml, and/or http(s).

Figure 2:
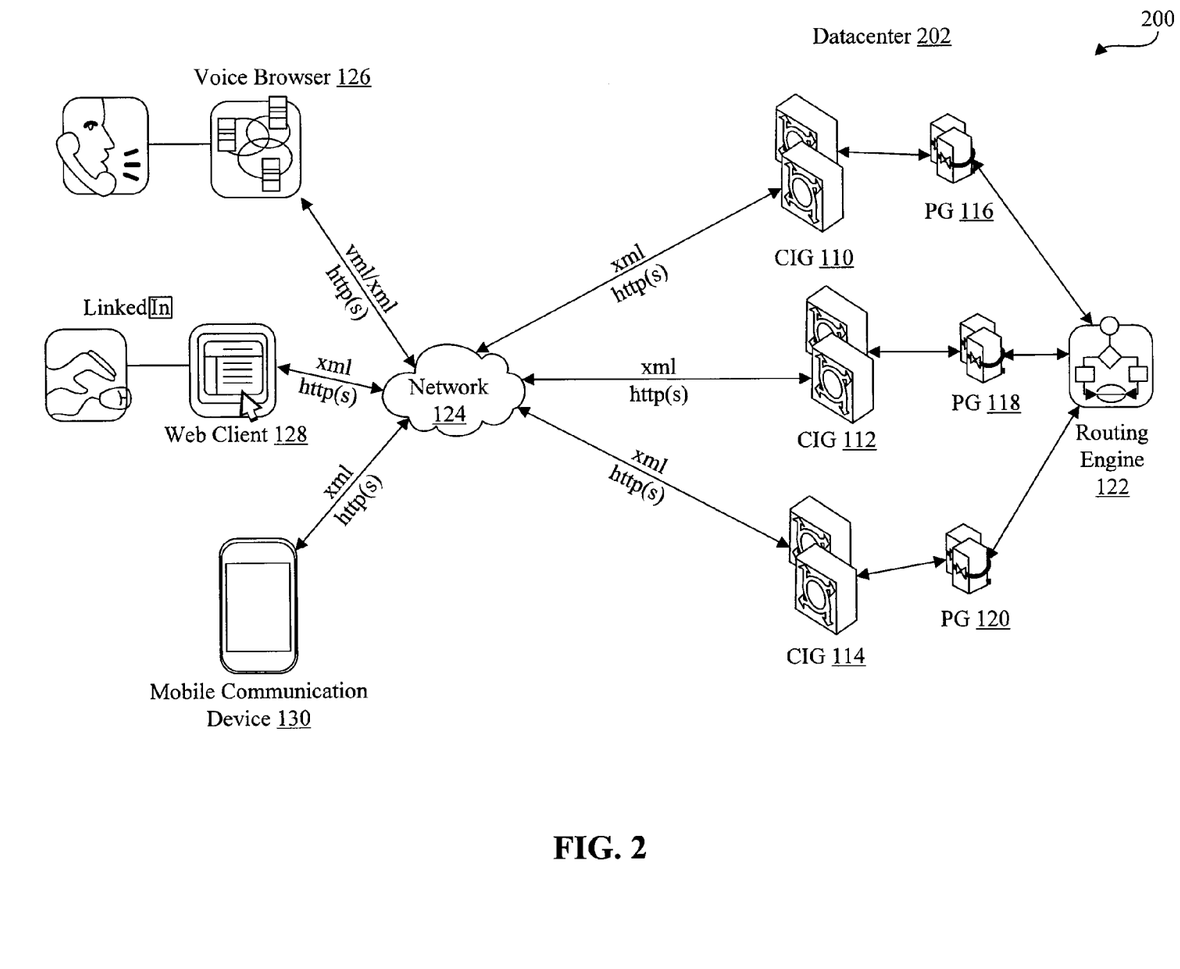
FIG. 2 shows an exemplary browser/device based system diagram in accordance with an embodiment.

Referring now to FIG. 2, a browser and/or device based system 200 for state awareness between communication channels and/or statefully transitioning a user between communication channels is disclosed. System 200 is configured, and operates, much the same as system 100. However, system 200 omits CATs 104, 106, 108. Rather, devices 126, 128, and/or 130 may be equipped with one or more applications for interacting and/or communicating with datacenter 202. Thus, system 200 may achieve higher operational speeds, particularly within the datacenter, where the delay associated with serving applications and/or application data to devices 126, 128, and/or 130 is eliminated. System 200 may further eliminate the necessity of providing storage and other computing resources (e.g., application servers) in the datacenter 202. Thus, system 200 may shift application processing and memory requirements to devices 126, 128, and/or 130.

Figure 3:
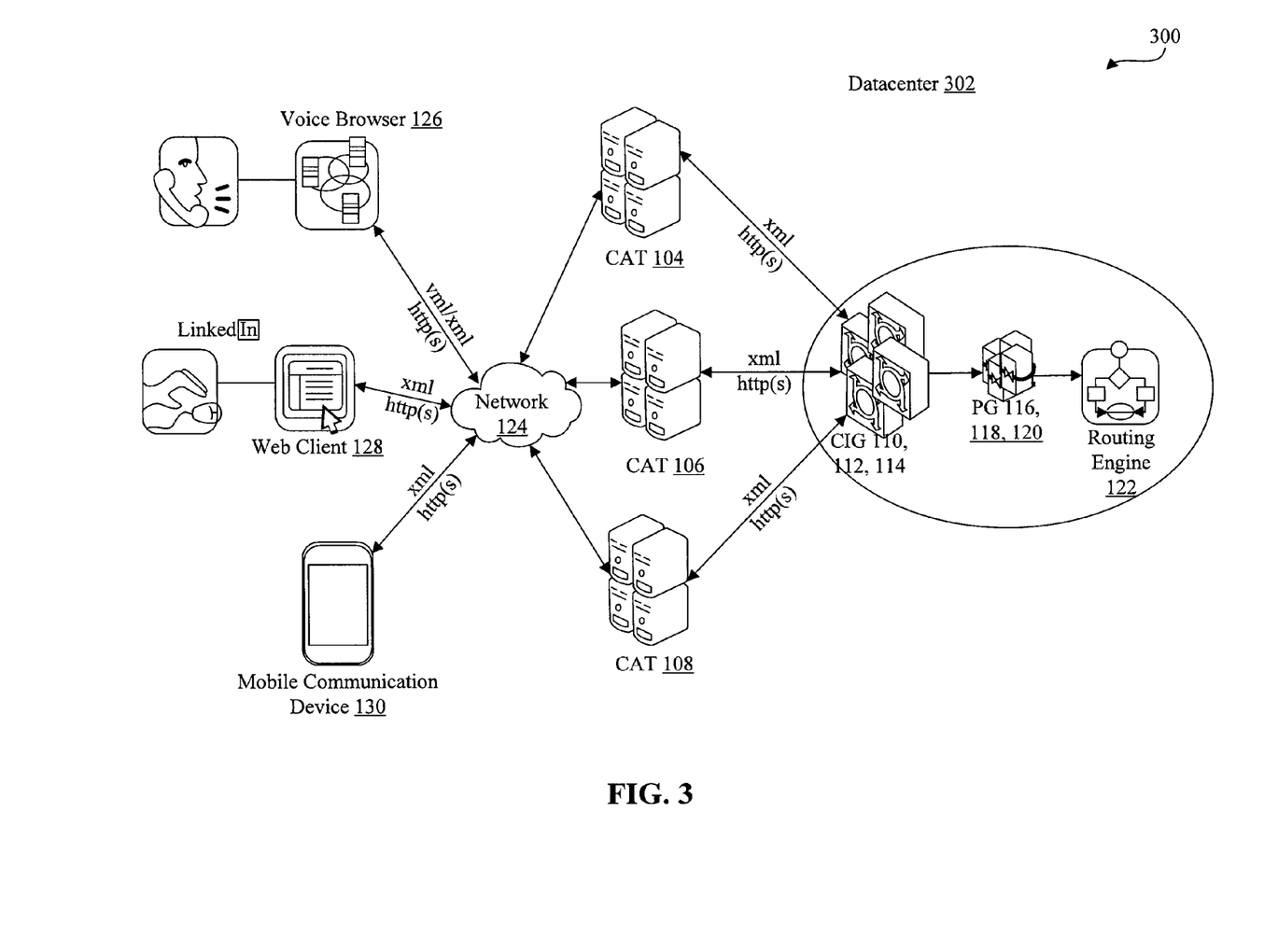
FIG. 3 shows an exemplary converged infrastructure system diagram in accordance with an embodiment.

With reference to FIG. 3, a browser and/or device based system 300 for state awareness between communication channels and/or statefully transitioning a user between communication channels is disclosed. System 300 is configured, and operates, similar to systems 100 and 200. However, system 300 may achieve greater efficiency (over systems 100 and/or 200) by virtue of the convergence of CIGs 110, 112, and/or 114 and/or PGs 116, 118, and/or 120. That is, delays associated with an expanded network architecture may be obviated and/or reduced by the converged network architecture shown in FIG. 3.

Figure 7:
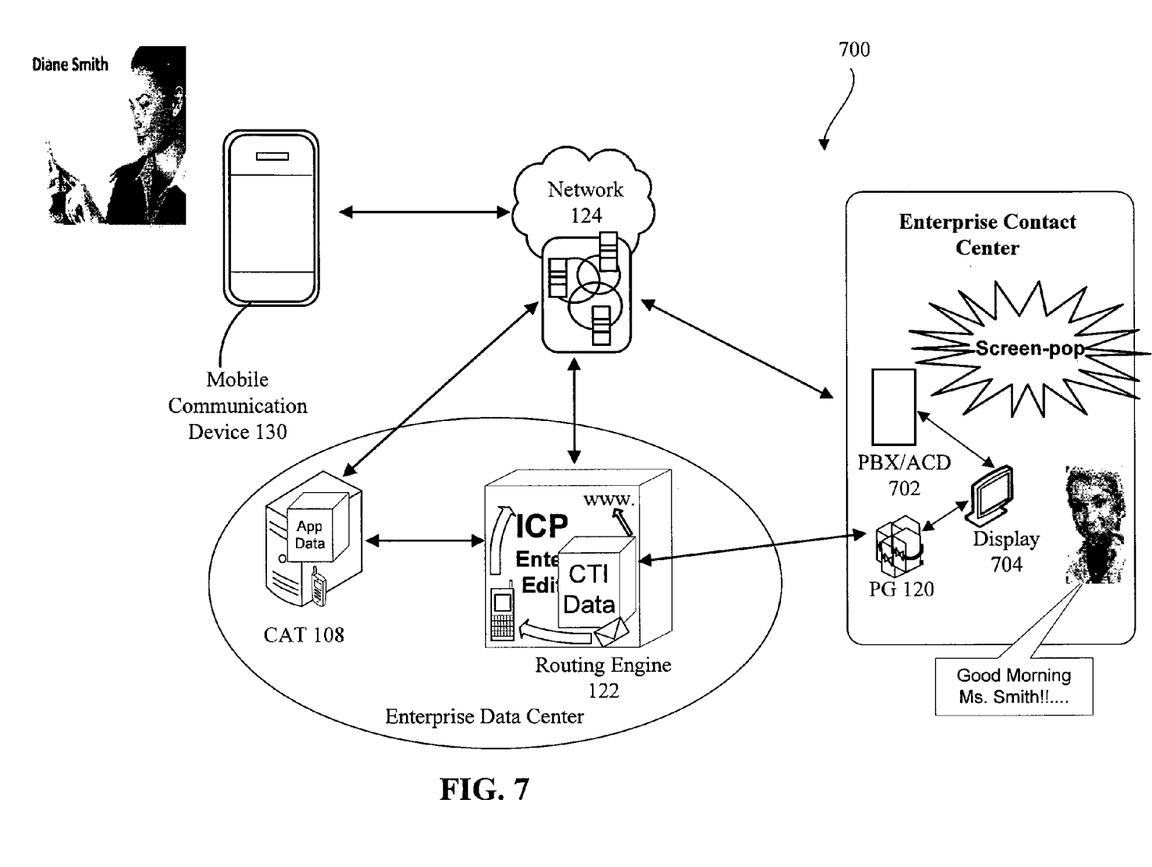
FIG. 7 shows an exemplary application tier based system diagram in accordance with an embodiment, in which a user seamlessly and statefully transitions from a web client based application to a user service agent.

With reference to FIG. 7, a browser and/or device based system 700 for state awareness between communication channels and/or statefully transitioning a user between communication channels is disclosed. More particularly, system 700 shows an example of a user seamlessly and statefully transitioning from a web client or mobile communication device based application to a user service agent. System 700 may be configured, and operate, similar to and/or the same as systems 100, 200, and 300. Systems 100, 200, 300, and/or 700 may, hereinafter and for simplicity, be referred to collectively as "systems" or "the systems."

With further regard to systems 100, 200, 300, and 700, the systems may maintain state awareness (e.g., permit a user to review EWTs), as described above, by virtue of a convergence between CIGs 110, 112, and/or 114 and/or routing engine 122. Thus, for example, the systems may provide EWTs to any and or all of a voice browser 126, a web client 128, and/or a mobile communication device 130. The systems may include a private branch exchange ("PBX") and/or automatic call distributor ("ACD") 702. These devices may, for example, help to distribute calls to one or more customer service representatives. Further, although systems 100, 200, and 300 are not shown with a PBX and/or ACD, these systems may nonetheless include such a device. System 700 also illustrates a customer user service agent display 704. A user service agent may receive screen pop via a display 704 (as described above). Systems 100, 200, and 300 may include a display 704, although, again, it is not shown in their respective figures.

Referring now to FIGS. 4-6 and 8 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 4-6 but also to the various system components as described above with reference to FIGS. 1-3 and 7.

Figure 4:
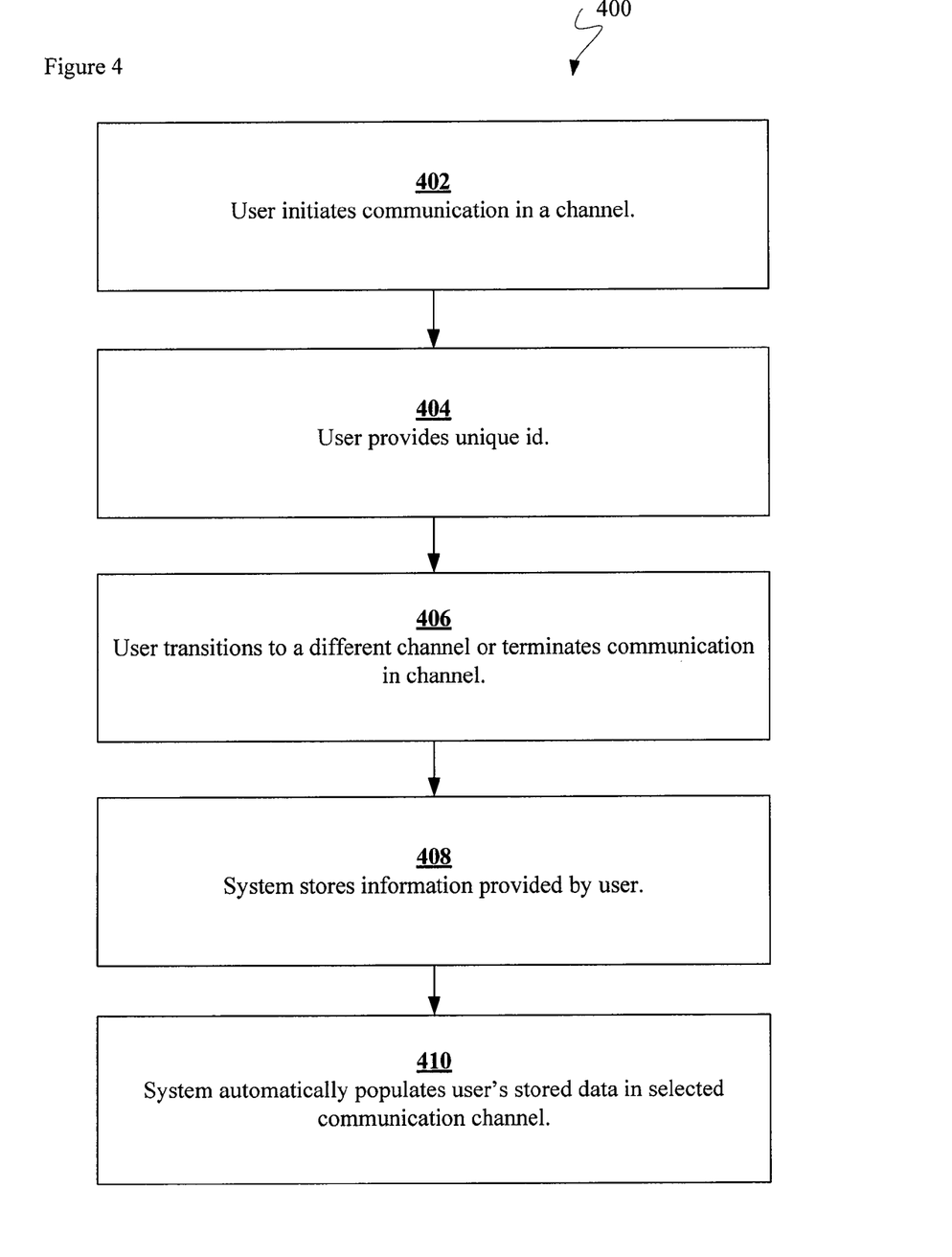
FIG. 4 shows a flowchart depicting an exemplary process for statefully transitioning between communication channels.

Referring to FIG. 4, a process 400 for state awareness between communication channels and/or statefully transitioning a user between communication channels is disclosed. More specifically, a process 400 for statefully transitioning a user from a first or "source" channel to a second or "destination" channel is disclosed. To this end, a user may initiate communication in a source channel, which may comprise, as described above, a voice, web, and/or mobile channel (step 402). A user may provide a unique identifier ("id") to one of the systems, and this identifier may serve as a mechanism for identifying the user across a variety of channels (step 404). A unique identifier may comprise a telephone number (e.g., where the user occupies a voice or mobile channel), an email address (e.g., where the user occupies a web or mobile channel), a combination of a user name and password, a social security number, a unique number, and/or the like.

A user may, at some point, wish to transition to a different channel or, in some instances, merely terminate communication in a particular channel (with or without some intention to return later). For instance, a user may occupy a particular channel, but realize after providing some information through the channel, that it is necessary or desirable to terminate or delay communication (e.g., a user may grow weary or depart for an appointment or to fulfill an obligation) (step 406). So that the user's progress may be preserved, the systems may store information provided by the user in the source channel. This information may be stored by the systems in any or a combination of CATs 104, 106, 108, CIGs 110, 112, 114, PGs 116, 118, 120, and/or routing engine 122 (step 408). For example, a user communicating data over a voice channel may store this data in a memory or data store associated with CAT 104. Likewise, a user communicating over a web channel may store data in a memory or data store associated with CAT 106, and/or a user communicating over a mobile channel may store data in a memory or data store associated with CAT 108. Where a datacenter does not include one or more CATs (e.g., system 200), a user's data may be stored in a memory or data store associated with the device 126, 128, and/or 130. Thus, the data that a user enters in a channel is not lost, but preserved for later retrieval.

In response to a user's transition to a destination channel, the systems may retrieve all or a portion of the data that the user has already entered from a memory or data store, as described above (step 410). The systems may retrieve data for a user based upon the unique identifier provided by the user, as described above. That is, for example, the systems may establish and utilize the user's unique id as a primary key in a database, memory, data store, etc and the data store may be configured to store any information provided by the user. In this manner, data may be associated with a particular user and stored by the systems such that it is preserved and available across a variety of communication channels.

Having retrieved this data, the systems may recognize empty fields (where the systems are attempting to populate a checklist, form, etc.) and request this data from the user. Likewise, the systems may recognize fields that contain data, or that may be populated with data from the memory or data store, and may not request this information from the user. Thus, a user who enters information in a source channel and transitions to a different (or the same) destination channel may be spared the inconvenient task of reentering data that was entered in a different or the same channel on a prior occasion. In other words, a user may be statefully transitioned between communication channels. A user may further statefully reenter a particular communication channel at a later time. Again, a user's data may be stored and later or simultaneously retrieved by the systems to spare the user the task of data reentry.

Figure 5:
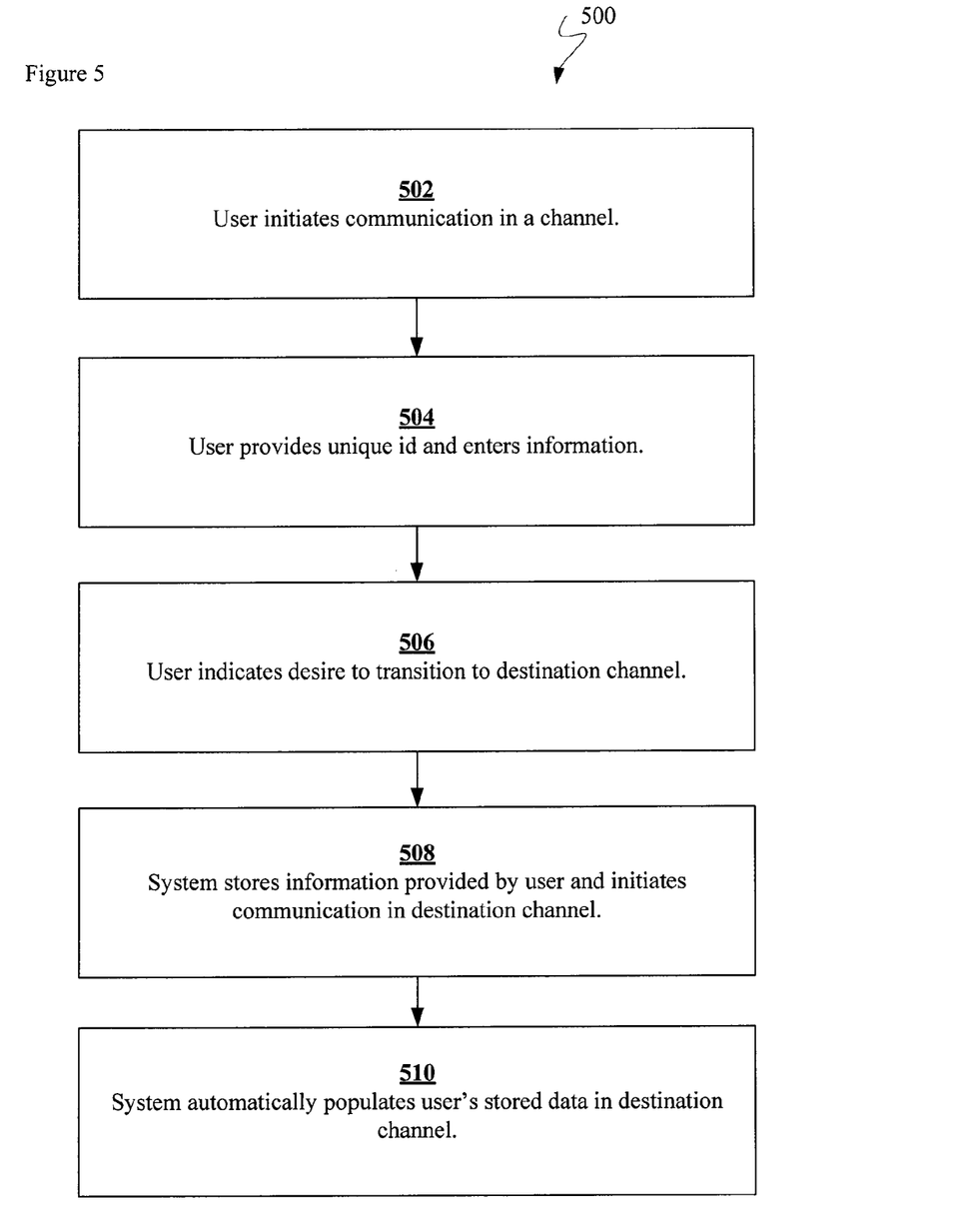
FIG. 5 shows a flowchart depicting an exemplary process for statefully transitioning a user from a source channel to a destination voice channel.

With reference to FIG. 5, systems 100, 200, and/or 300 may operate, in a specific example, as follows. A user may enter a communication channel (step 502) and provide a unique id (step 504), as described above. The communication channel may comprise, for example, any of a web, mobile, or voice channel. However, where, for instance, the communication channel comprises a web or mobile channel, the user may request (or be automatically directed), perhaps due to some frustration or difficulty with the web or mobile application and/or because the user has answered a requisite number of questions, a transition to a voice channel (e.g., the user may request or be transitioned to a customer service representative) (step 506). In response, the systems may store any information provided by the user and initiate communication in the (voice) destination channel (step 508).

For instance, the systems may place a call (or facilitate the placement of a call), using the user's telephone number, to the user's mobile device 126. The systems may, in addition, provide a customer service phone number to the user's device 126, 128, and/or 130, which the user may dial to speak with a customer service representative. Advantageously, a customer service representative may be selected according to the information provided by the user in the source channel. Moreover, the data (or a portion of the data) entered by the user in the source channel may be automatically populated (e.g., "screen popped") by the systems in an electronic (e.g., a computer) display of the customer service representative (step 510). Thus, a customer service representative may review the information provided by a customer in one or more channels, and this information may be provided to the customer service representative in the destination channel by way of a "screen pop." The customer service representative may select more or less information for the screen pop. Likewise, in the event that a user has not elected to speak with a customer service representative in a voice channel, but has accessed a destination channel (the same or different from the source channel) as part of an effort to enter additional information (or as part of an effort to resolve a confusing or frustrating question), the information stored by the systems in the source channel may be automatically populated for the user in the destination channel. Further still, where a user speaks with a customer service representative, the systems may permit the customer service representative to statefully transition the user to a web, mobile, and/or another voice destination channel (e.g., the user may receive an email and/or transition to a voice channel with another customer service representative).

Figure 6:
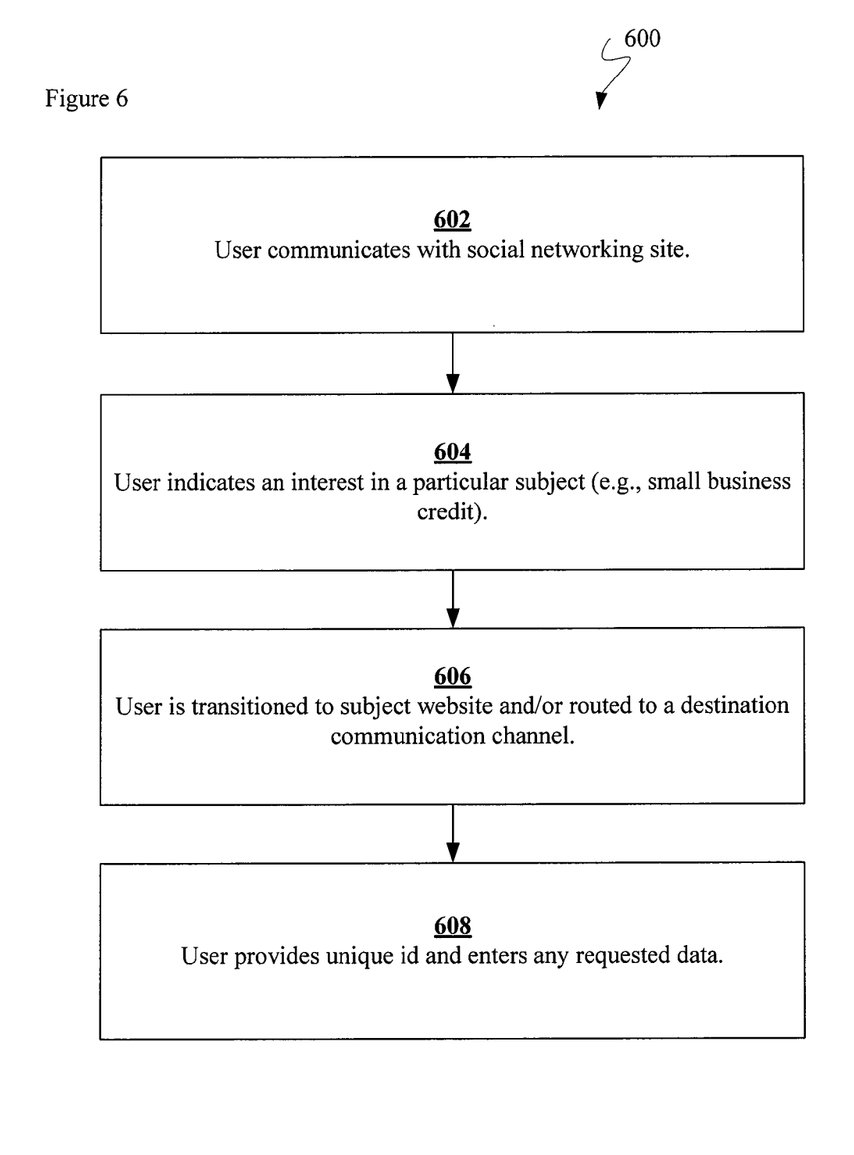
FIG. 6 shows a flowchart depicting an exemplary process for statefully transitioning a user from a social networking website to a destination channel.

Referring to FIG. 6, systems 100, 200, and/or 300 may operate in conjunction with one or more social networking websites as follows. For example, a user may communicate with a social networking website, such as Facebook®, MySpace®, etc. (step 602). The social networking website with which the user is in communication may present or display an option (e.g., a link, image, icon, text, advertisement, offer, promotion, etc.) associated with a particular subject (e.g., a small business credit) in which the user may have some interest (step 604). The user may select the option at which point the user may be transitioned or directed to a website associated with the subject and/or transitioned to a destination communication channel (e.g., a web channel, a mobile channel, and/or a voice channel) (step 606). The user may provide a unique id (as described above) in the destination channel or to the destination website (as described above) at which point the user may statefully transition between communication channels (as described above).

Figure 8:
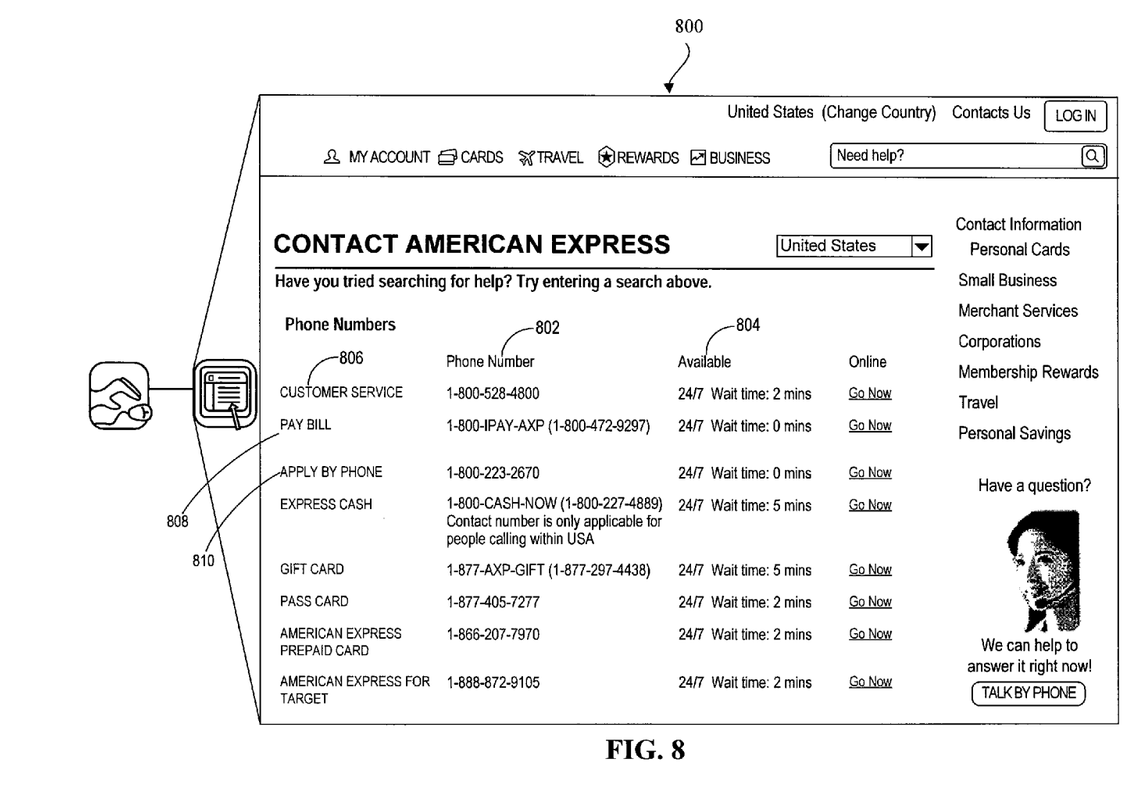
FIG. 8 shows an exemplary webpage for maintaining state awareness across communication channels.

Referring to FIG. 8, an exemplary webpage 800 in which systems 100, 200, 300, and/or 700 operate to maintain state awareness between communication channels is shown. The systems may maintain state awareness, for example, to provide EWTs to users. Thus, for example, a user who browses a webpage 800 via web client 128 and/or mobile communication device 130 may conclude that he would like to contact a user service agent. The webpage 800 may display a variety of user service agent contact phone numbers 802 and the (real time) EWTs 804 associated with each. One or more converged and/or centralized CIGs 114 and routing engines 122 may enable the maintenance of state awareness between channels and/or user service agents in a single channel. Thus, a user may select particular channel and/or user service agent in a channel based upon the EWTs associated with each channel and/or user service agent within each channel. A user who has multiple queries (e.g., new application, payment, and, normal servicing) may select a "Pay Bill" option 808 and/or an "Apply by Phone" option 810, as opposed to a "Customer Service" option 806, because the former two options are associated, in the example at FIG. 8, with zero EWTs, while the latter option is associated with a 2 minute EWT. Further, a user may select from webpage 800 a "callback" option (not shown). A callback option may permit a user to indicate that he would like to receive a telephone call from a user service agent after, for example, the expiration of an EWT and/or upon the availability of a user service agent. This option may be particularly helpful where, for example, an EWT comprises a duration that a user finds unacceptable or is unwilling to endure. For example, a user may see, via webpage 800, that the shortest EWT available is fifteen minutes. The user may wish to select a call back option if he would prefer not to wait on hold for this duration. A user service agent may call the user when the EWT expires and/or when the user service agent is available to assist the user.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.\

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts or devices, a transponder and reader in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    retrieving, by a computer-based system for statefully transitioning a user between a source channel and a destination channel, data associated with the user based upon a user identifier, and in response to the user entering the destination channel that is different from the source channel;
    populating, by the computer-based system, the data associated with the user in the destination channel;
    transmitting, by the computer-based system, a telephone number associated with a customer service representative to a device associated with the user, wherein the telephone number is based upon information provided by the user in the source channel;
    maintaining, by the computer-based system, a state awareness between communication channels; and
    displaying, by the computer-based system and based upon the state awareness, an estimated wait time.

2. The method of claim 1, wherein the destination channel is a display of a customer service representative and the populating occurs automatically.

3. The method of claim 1, further comprising calling, by the computer-based system, a telephone number associated with the user in response to at least one of: the user answering a requisite number of questions in the source channel and the user requesting a transition to a voice destination channel.

4. The method of claim 1, further comprising transitioning, by the computer-based system, the user to a destination channel in response to the user selecting an option on a social networking website.

5. The method of claim 1, further comprising statefully transitioning, by the computer-based system, the user to a destination channel that is at least one of a web channel, a mobile channel, and a voice channel.

6. A system comprising:
- a processor for statefully transitioning a user between a source channel and a destination channel;
- a tangible, non-transitory memory communicating with the processor;
- the tangible, non-transitory memory having instructions stored thereon that, in response to execution by the processor, cause the processor to perform operations comprising:
  - retrieving, by the processor, data associated with the user based upon a user identifier, and in response to the user entering the destination channel that is different from the source channel;
  - populating, by the processor, the data associated with the user in the destination channel;
  - transmitting, by the processor, a telephone number associated with a customer service representative to a device associated with the user, wherein the telephone number is based upon information provided by the user in the source channel;
  - maintaining, by the processor, a state awareness between communication channels; and
  - displaying, by the processor and based upon the state awareness, an estimated wait time.

7. The system of claim 6, wherein the destination channel is a display of a customer service representative and the populating occurs automatically.

8. The system of claim 6, further comprising calling, by the processor, a telephone number associated with the user in response to at least one of; the user answering a requisite number of questions in the source channel and the user requesting a transition to a voice destination channel.

9. The system of claim 6, further comprising transitioning, by the processor, the user to a destination channel in response to the user selecting an option on a social networking website.

10. The system of claim 6, further comprising statefully transitioning, by the processor, the user to a destination channel that is at least one of a web channel, a mobile channel, and a voice channel.

11. An article of manufacture including a non-transitory, tangible computer readable medium having instructions stored thereon that, in response to execution by a computer-based system for statefully transitioning a user between a source channel and a destination channel, cause the computer-based system to perform operations comprising:
- retrieving, by the computer-based system, data associated with the user based upon a user identifier, and in response to the user entering the destination channel that is different from the source channel;
- populating, by the computer-based system, the data associated with the user in the destination channel;
- transmitting, by the computer-based system, a telephone number associated with a customer service representative to a device associated with the user, wherein the telephone number is based upon information provided by the user in the source channel;
- maintaining, by the computer-based system, a state awareness between communication channels; and
- displaying, by the computer-based system and based upon the state awareness, and estimated wait time.

12. The article of claim 11, wherein the destination channel is a display of a customer service representative and the populating occurs automatically.

13. The article of claim 11, further comprising calling, by the computer-based system, a telephone number associated with the user in response to at least one of: the user answering a requisite number of questions in the source channel and the user requesting a transition to a voice destination channel.

14. The article of claim 11, further comprising transitioning, by the computer-based system, the user to a destination channel in response to the user selecting an option on a social networking website.

* * * * *